INVENTOR
ROBERT H. RACH
BY Norbert P. Holler
ATTORNEY

United States Patent Office 3,511,743
Patented May 12, 1970

3,511,743
HIGH STRETCH THERMAL INSULATING LAMINATES
Robert H. Rach, Washington, Ind., assignor to Uniroyal, Inc., a corporation of New Jersey
Filed May 31, 1966, Ser. No. 553,867
Int. Cl. B32b 3/10, 3/26; A41d 13/00
U.S. Cl. 161—117
21 Claims

ABSTRACT OF THE DISCLOSURE

A high stretch, flexible, thermal insulating laminate, composed of a cellular rubber or plastic sponge or foam core sheet having fluid-impervious rubber or plastic film skins bonded to its broad faces, is disclosed. The high stretchability of the laminate is provided by means of multiple, generally parallel slits in the core sheets, the slits extending either wholly through the core sheet from one face thereof to the other, or in an alternating sequence in from one face or the other and partly through the core sheet, and being oriented at an angle between 30° and 60° to the perpendicular to the core sheet faces. The presence of the so-oriented slits has no adverse effect on the insulating function of the laminate.

---

The foregoing abstract is not to be taken either as a complete exposition or as a limitation of the present invention, and in order to understand the full nature and extent of the technical disclosure of this application, reference must be had to the following detailed description and the accompanying drawing as well as to the claims.

This invention relates to a flexible and highly stretchable thermal insulating laminate material, and in particular to materials of this type the insulating function of which is not impaired when such laminates are subjected to elevated external pressures while in a stretched state.

With recent developments and advances in both space and undersea travel and exploration techniques and technology, man can now fly higher, dive deeper and remain subjected to adverse environmental conditions longer than ever before. As a concomitant thereof, it has become absolutely essential to find a practical solution to the severe problem of conservation of body heat by means of either the space and diving suits worn at such times or the insulation of the vehicle or shelter in which the astronaut or diver is then located, to the end that the maintenance of insulating function does not interfere with the flexibility and stretchability of the suits and thus with the mobiliy of the wearer and with his ability to don and doff the suit, and vice versa, even under conditions of high external pressure. Currently available thermal insulating laminates, however, generally are not capable of meeting both the thermal insulation and mobility requirements.

An important object of the present invention, therefore, is the provision of flexible and highly stretchable laminate materials which can be incorporated in a space suit or in a diving suit that will at all times closely conform to the body contours of the wearer while giving him the maximum possible freedom of movement without substantial loss of insulating efficiency even when subjected to relatively high external pressures.

Another object of the present invention is the provision of such laminate which are also suitable for use as general thermal insulation in vehicles and shelters which may be subjected to high external pressures while in use under adverse temperature conditions.

Figure 1:
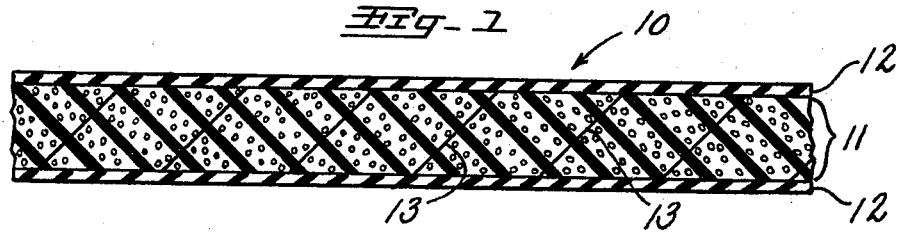
Figure 2:
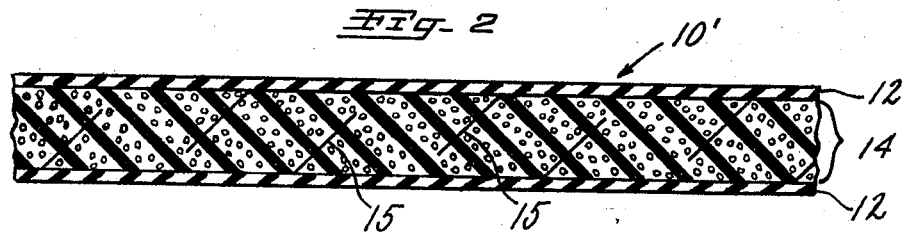
Figure 3:
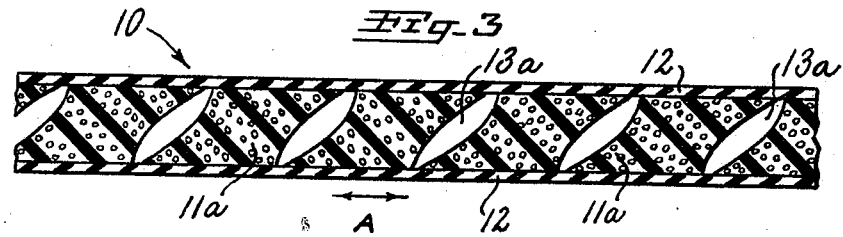
Figure 4:
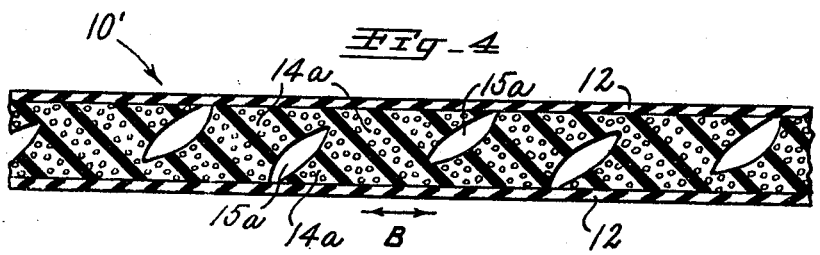

The foregoing and other objects, as well as the characteristics and advantages of the present invention, will be more fully understood from the following detailed description thereof when read in conjunction with the accompanying drawing, in which:

FIGS. 1 and 2 are fragmentary, diagrammatic illustrations, in section, of two embodiments of the laminate material according to the present invention; and
FIGS. 3 and 4 are similar views of the laminates shown in FIGS. 1 and 2 when subjected to tension.

As has been indicated hereinabove, the laminate material according to the present invention may be utilized in forms of wearing apparel as well as in forms of other types of enclosures adapted to house both human beings and inanimate instrumentalities. Merely by way of example, a laminate material generally used in the manufacture of one known type of skin diving suits is essentially composed of a relatively thick sheet of unicellular or closed-cell rubber provided at one face with a fluid-impermeable skin defined by a suitably molded face of the sheet. See, for example, U.S. Pat. Nos. 2,749,551 and 2,981,954. Conventionally, such closed-cell rubber materials have a relatively high modulus, i.e. a relatively high resistance to stretching. This resistance usually makes it somewhat difficult to don or doff a diving suit of such material, inasmuch as such suits are patterned to conform closely to the surface and the contours of the wearer's body. The resistance to stretch is also a serious impedient to the wearer of the suit in that it adversely affects his ease of movement, as well as the possible extent of movement, in those areas where flexing is a necessity, i.e. at the feet, knees, hips, elbows, shoulder joints, etc. In fact, the force required to flex such conventional insulating type sheet material diving suits consumes a considerable amount of the energy of the diver, resulting both in his becoming tired more rapidly and in a less effective use of his abilities.

In accordance with the present invention, therefore, wearing apparel such as a diving suit or a space suit (not shown) may be made at least in part of a laminate material 10 (FIGS. 1 and 3) which comprises a core 11 consisting of a ⅛ to 1 inch, and preferably ¼ inch, thick sheet of cellular rubber or plastic, e.g. either an open-cell or closed-cell sponge or foam, to the opposite faces of which are adhered relatively thin, fluid-impermeable, low modulus skins or films 12 of rubber or plastic each about 0.005 to 0.031 inch, and preferably about 0.015 inch, thick. To provide the requisite stretchability, the core sheet 11 is transversely slit, as indicated at 13, the slits being spaced about ¹⁄₁₆ to 1 inch, and preferably about ¼ inch, apart and being oriented substantially parallel to each other and at an angle of between 30° and 60°, and preferably at an angle of 45°, to the perpendicular to the opposite faces of the sheet. The arrangement is such that the application of a stretching force, indicated by the double-headed arrow A in FIG. 3, to the laminate material 10 causes the sections 11a of the core sheet 11 to be pulled away from each other over substantially the full expanse of each slit, except that at the skins 12 to which the core sections are adhered, the separation is relatively slight. The slits thus impart to the overall laminate an anisotropic modulus characteristic which is considerably lower than the modulus of the core sheet in its unslit form.

Alternatively, the core sheet need not be slit through its entire thickness. As shown in FIGS. 2 and 4, the laminate 10' according to this aspect of the present invention is composed of impervious rubber or plastic skins or films 12 adhered to the opposite faces of a cellular sponge or foam core sheet 14 which is transversely slit, as indicated at 15, inwardly from its opposite faces in an alternating sequence, with each slit 15 terminating short of the respective other face of the sheet. In the laminate 10', each slit extends more than halfway through the thickness of the core sheet, and preferably through at least 60% thereof, as measured along the normal to the faces of the sheet. As in the first-described embodiment of the invention, the slits 15 are oriented substantially parallel to each other and at an angle of between 30° and 60°, and preferably at an angle of 45°, to the perpendicular to the opposite faces of the sheet. Also, the planes of the slits are spaced about 1/16 to 1 inch, preferably about 1/4 inch, apart, which requires that the slits at each face of the core sheet be spaced about 1/8 to 2 inches, and preferably about 1/2 inch, apart.

The arrangement thus is such that the application of a stretching force, indicated by the doubleheaded arrow B in FIG. 4, to the laminate 10' causes the partly severed portions 14a of the core sheet 14 to be pulled away from each other as the slits widen as shown at 15a. The laminate core sheet 14, consequently, is also possessed of an anisotropic modulus characteristic which is considerably lower than the modulus which the core sheet would have if unslit. For obvious reasons, of course, the stretchability of the laminate 10' will be somewhat less than that of the laminate 10, although not very much so even at the minimum contemplated dimensions of the slits 15. It should be equally clear, however, that if these slits were to extend only through less than one-half the thickness of the core sheet, the enhanced stretchability aimed at by the present invention could not be properly achieved since there would be at the center of the core sheet a continuous coplanar web of foam or sponge, i.e. a web not traversed by any slits, which would limit the stretchability of the laminate essentially to that of the unslit core sheet portion.

The preferred materials for the implementation of the principles of the present invention are, for the core, open-cell plastic or rubber latex foams which have an inherently low modulus of elongation, quick recovery, good tear strength, low compression set, low density, and small and uniform pore sizes, and for the skins, plastic or rubber films which have an inherently low modulus as well as good tear and snag resistance and are either compatible with or can be readily bonded to the insulative foam material. It will be understood that the term "rubber" as used herein is intended to designate both natural and synthetic rubbers as well as blends thereof. The open-cell core structure is preferred because it enables the interior of the laminate to be gas-pressurized to a value substantially equal to the ambient exterior fluid pressure, which is found highly advantageous especially in deep diving suits to prevent a total collapse of the core sheet cells which would otherwise occur as the wearer descends to depths in excess of about 100 feet or so. A diving suit intended for use only in less than such very deep submergence conditions may, of course, be made with a closed-cell core structure.

More specifically, the core sheet may be composed of such plastic materials as polyurethane foams, vinyl foams and the like made, for example, by incorporating a gas under pressure in the respective compounds. Alternatively, the core sheet of the laminate may be composed of natural rubber latex, SBR latex foam, neoprene latex foam, isoprene latex foam, a latex foam of a blend of natural rubber with a synthetic rubber such as SBR or cis-polyisoprene, a latex foam of a blend of synthetic rubbers such as SBR and cis-polyisoprene, butyl sponge, etc. The same latices, alone or in blends, as well as such synthetic rubber materials as butyl and plastic materials as polyurethane and the like, can be used to make the films constituting the skins of the laminate. Tie cements or adhesives for joining such films and core sheets if composed of dissimilar materials are well-known and thus need not be itemized herein. The choice of any such skin material will, of course, depend to a certain extent on the ambient conditions to be encountered, and thus the material may be suitably compounded to provide improved resistance to oil, ozone, sunlight, natural aging, water absorption, etc.

A further particular advantage of the angularly slit core laminate material of the present invention is that its insulating function is not adversely affected despite the presence of the slits 13 or 15. When such a laminate is subjected, after having been stretched, to a high external fluid pressure, the core sections 11a or 14a are pressed toward each other, effectively closing the theretofore enlarged slits (designated 13a and 15a in FIGS. 3 and 4). It will be readily understood that this condition will not result if the core sheet is slit at less than 30° to the perpendicular to the faces of the laminate, since in such material, when the same is subjected to compression, the open slits tend to bulge laterally and open even further, defining, between the skins of the laminate or between each skin and an opposed unslit portion of the core sheet, interior spaces in which no insulating foam or sponge material is present.

It will be appreciated that there are a number of ways in which the laminate 10 according to the present invention can be produced, subject only to the requirement that the core sheet 11 must be slit before the second skin film 12 is applied thereto. Merely by way of example, one way would be to apply a film of rubber or plastic to one face of a precured sheet of foam or sponge, cure the film to form a fluid-impermeable skin, slit the sheet of foam from its uncoated face down to but not through the applied skin, apply a film of rubber or plastic to the uncoated face of the slit sheet, and cure this film to form the second fluid-impermeable skin. Care must, of course, be taken that the sections of the slit sheet are maintained in close and undisplaced abutting relation to each other during the application and curing of the second film. On the other hand, in making the laminate 10', the core sheet 14 must be slit in from each face thereof before the respective skin film 12 is applied to that face. Other variants of these methods will readily suggest themselves to those skilled in the art.

Again merely by way of example, it is noted that the skin films 12 can be made by calendering or casting techniques, or by dipping a suitable form into liquid rubber and thereafter peeling the resultant skin sheet therefrom. Also, the skin films can be cured either before or after being contacted with the respective faces of the core sheets. Where the foam or sponge and skin materials are compatible, of course, it is possible simply to provide a layer of wet latex as an adhesive between the core sheet and the films.

The slit laminate of the present invention, produced in the above-described or any other desired manner, may be fabricated into a space or diving suit, for example, by generally conventional butt seaming techniques, except that when the core sheet is an open-cell foam material the abutting edges of adjacent laminate sections (e.g. at the juncture between torso and sleeve, etc.) must be kept free of adhesive to ensure that the pressurizing gas (e.g. air) may pass freely to all components or sections of the suit. The butted edges are reinforced and held together at the inner and outer faces of the laminate sections by separately prepared and applied tapes of low modulus rubber film approximately 0.10 inch thick and 0.750 inch wide, these tapes being adhered to the laminate sections with conventional adhesives. All raw edges of the laminated construction, such as appear at the wrists, ankles, neck, etc. are rendered fluid-impermeable by applying a suitable coating of a low modulus rubber latex thereover and curing.

It will be apparent that the slit laminate according to the present invention need not be used throughout the entire expanse of such a suit, but may be restricted to certain selected areas thereof, such as the elbow and knee joints, the neck, wrist and ankle sleeve portions of the suit top and bottom, the shoulder regions, and the neck portion of a pullon head covering, at all of which a substantial amount of stretching occurs when the suit is being put on or taken off. Also, it is possible to make completely separate suit components of such a laminate, e.g., pull-on shoe, glove and head sections, etc.

As previously indicated, furthermore, the slit laminate according to the present invention may be used, with advantageous results, as an insulating surface or wall component of collapsible and inflatable shelters or vehicles, for example such as are presently being used for underwater research and exploration and are illustrated on pages 789, 790 and 791 of the June 1964 issue (vol. 125, No. 6) of "National Geographic" magazine. In such a structure, the laminate would be subjected to considerable external pressures, but its insulating function would not be impaired due to the tendency of the slits to close (even if the laminate is stretched) under the influence of such pressures.

It is to be understood that the foregoing detailed description is for purposes of illustration only and that a number of changes and modifications may be made both in the proportions and ranges of materials and in the structural and procedural features and relationships disclosed, none of which involves a departure from the spirit and scope of the present invention as defined in the hereto appended claims.

Having thus described my invention, what I claim and desire to protect by Letters Patent is:

1. A flexible, high stretch, thermal insulating laminate for use in environments where it may be subjected to high external pressures, comprising a core sheet composed of cellular sponge or foam provided at its opposite broad faces with respective fluid-impermeable skins composed of rubber or plastic film, said core sheet being provided intermediate said skins with a plurality of non-intersecting slits each oriented at an angle of between about 30° and 60° to the perpendicular to said skins, the orientation of said slits at said angle causing said slits to effectively close under high external pressures applied to said laminate even when the same is in a stretched condition, whereby the insulating function of the laminate is not adversely affected under such high external pressures.

2. A laminate according to claim 1, said slits being substantially parallel to each other.

3. A laminate according to claim 1, said slits being oriented at an angle 45° to the perpendicular to said skins.

4. A laminate according to claim 1, said slits extending entirely through said core sheet from one of said faces thereof to the other.

5. A laminate according to claim 4, said slits being spaced between about 1/16 and 1 inch apart.

6. A laminate according to claim 4, said slits being spaced about 1/4 inch apart.

7. A laminate according to claim 1, said slits in an alternating sequence each starting at a respective one of the opposite faces of said core sheet and each terminating short of the respective other face of said core sheet, and each of said slits extending more than halfway through the thickness of said core sheet.

8. A laminate according to claim 7, each of said slits extending through at least 60% of the thickness of said core sheet.

9. A laminate according to claim 8, said slits at each face of said core sheet being spaced between about 1/8 and 2 inches apart.

10. A laminate according to claim 8, said slits at each face of said core sheet being spaced about 1/2 inch apart.

11. A laminate according to claim 1, said core sheet being composed of rubber latex foam.

12. A laminate according to claim 1, said core sheet being composed of polyurethane foam.

13. A laminate according to claim 1, said core sheet being composed of butyl sponge.

14. A laminate according to claim 1, said core sheet being composed of vinyl foam.

15. A laminate according to claim 1, said cellular sponge or foam being an open-cell structure.

16. A laminate according to claim 1, said cellular sponge or foam being a closed-cell structure.

17. A laminate according to claim 1, said core sheet being between about 1/8 and 1 inch thick, said skins each being between about 0.005 and 0.031 inch thick.

18. A laminate according to claim 1, said core sheet being about 1/4 inch thick, and said skins each being about 0.015 inch thick.

19. A laminate according to claim 1, said skins being made of polyurethane film.

20. A laminate according to claim 1, said skins being made of butyl rubber film.

21. A laminate according to claim 1, said skins being made of rubber latex film.

References Cited

UNITED STATES PATENTS

| | | | |
|---|---|---|---|
| 2,735,426 | 2/1956 | Claydon | 161—117 |
| 2,976,539 | 3/1961 | Brown | 161—113 |
| 3,041,220 | 6/1962 | Martin et al. | 161—161 |
| 3,076,206 | 2/1963 | Shaw et al. | 2—82 |

W. J. VAN BALEN, Primary Examiner

U.S. Cl. X.R.

2—2.5, 272; 156—252, 257, 268; 161—161

PO-1050
(5/69)

UNITED STATES PATENT OFFICE
CERTIFICATE OF CORRECTION

Patent No. 3,511,743  Dated May 12, 1970

Inventor(s) Robert H. Rach

It is certified that error appears in the above-identified patent and that said Letters Patent are hereby corrected as shown below:

Column 3, lines 57-58, "natural rubber latex" should read --natural rubber latex foam"--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents